United States Patent
Tajiri et al.

(10) Patent No.: US 12,160,075 B2
(45) Date of Patent: Dec. 3, 2024

(54) ROTARY CONNECTOR DEVICE AND FLAT CABLE ASSEMBLY FOR ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yoji Tajiri, Inukami-gun (JP); Yoshihiro Shiotani, Inukami-gun (JP); Hirofumi Utsunomiya, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 328 days.

(21) Appl. No.: 17/680,298

(22) Filed: Feb. 25, 2022

(65) Prior Publication Data
US 2022/0181830 A1 Jun. 9, 2022

Related U.S. Application Data

(63) Continuation of application No. PCT/JP2020/033070, filed on Sep. 1, 2020.

(30) Foreign Application Priority Data

Sep. 5, 2019 (JP) ................................. 2019-161991

(51) Int. Cl.
*H01R 35/04* (2006.01)
*H01B 7/04* (2006.01)
(Continued)

(52) U.S. Cl.
CPC ............... *H01R 35/04* (2013.01); *H01B 7/04* (2013.01); *H01R 35/025* (2013.01); *B60R 16/027* (2013.01)

(58) Field of Classification Search
CPC .......... B60R 16/027; H01B 7/04; H01B 7/08; H01R 35/04; H01R 35/025
(Continued)

(56) References Cited

U.S. PATENT DOCUMENTS 5,286,219 A * 2/1994 Ueno ..................... H02G 11/00
439/15
5,304,071 A 4/1994 Bannai et al.
(Continued)

FOREIGN PATENT DOCUMENTS

CN 1372359 10/2002
CN 103378527 10/2013
(Continued)

OTHER PUBLICATIONS

Korean Office Action for corresponding KR Application No. 10-2022-7006346 Dec. 5, 2023 (w/ English machine translation).
(Continued)

*Primary Examiner* — Marcus E Harcum
(74) *Attorney, Agent, or Firm* — Mori & Ward, LLP

(57) ABSTRACT

A flat cable assembly for a rotary connector device includes a first lead block, a first flat cable, and a second flat cable. The first lead block includes a first lead block body and a first conductor that includes a first exposure surface exposed from the first lead block body and is attached to the first lead block body. The first flat cable includes a first cable end portion connected to the first exposure surface so as to extend from the first exposure surface in a first direction. The second flat cable includes a second cable end portion connected to the first exposure surface so as to extend from the
(Continued)

first exposure surface in a second direction, which is different from the first direction.

16 Claims, 8 Drawing Sheets

(51) Int. Cl.
*H01R 35/02* (2006.01)
*B60R 16/027* (2006.01)

(58) Field of Classification Search
USPC ........................................................ 439/164
See application file for complete search history.

(56) References Cited

U.S. PATENT DOCUMENTS

| | | | | |
|---|---|---|---|---|
| 5,683,259 | A * | 11/1997 | Sato ................. | B60R 16/027 439/15 |
| 5,944,544 | A | 8/1999 | Kuroda et al. | |
| 5,951,322 | A * | 9/1999 | Nishikigi ............ | B60R 16/027 439/456 |
| 6,109,942 | A | 8/2000 | Bannai | |
| 6,641,404 | B2 | 11/2003 | Matsuzaki et al. | |
| 6,736,645 | B2 * | 5/2004 | Kato ................. | H01R 35/025 439/15 |
| 7,775,800 | B2 * | 8/2010 | Reischl ............. | H01R 35/025 439/15 |
| 7,878,813 | B2 * | 2/2011 | Simonis ............ | H01R 35/025 439/15 |
| 8,678,835 | B2 * | 3/2014 | Takahashi ......... | H01R 12/592 439/13 |
| 8,870,577 | B2 * | 10/2014 | Arakawa .......... | H01R 35/025 439/15 |
| 10,351,083 | B2 * | 7/2019 | Kanazawa ........ | H01R 12/592 |
| 2002/0039850 | A1 | 4/2002 | Sugata | |
| 2002/0115312 | A1 | 8/2002 | Matsuzaki et al. | |
| 2003/0008541 | A1 * | 1/2003 | Oguma ............. | H01R 35/02 439/164 |
| 2009/0142937 | A1 | 6/2009 | Simonis et al. | |
| 2016/0336704 | A1 | 11/2016 | Tsushima et al. | |
| 2019/0165502 | A1 | 5/2019 | Hiroki et al. | |

FOREIGN PATENT DOCUMENTS

| | | |
|---|---|---|
| CN | 106159620 | 11/2016 |
| CN | 109155475 | 1/2019 |
| EP | 1993877 | 11/2008 |
| EP | 3093932 | 11/2016 |
| EP | 3432423 | 1/2019 |
| JP | 04-226282 | 8/1992 |
| JP | H07-22140 | 1/1995 |
| JP | 11-329654 | 11/1999 |
| JP | 2000-294357 | 10/2000 |
| JP | 2002-43008 | 2/2002 |
| JP | 2002-246133 | 8/2002 |
| JP | 2002-246134 | 8/2002 |
| JP | 2002-246135 | 8/2002 |
| JP | 2002-246136 | 8/2002 |
| JP | 3889231 B2 | 8/2002 |
| JP | 2009-529774 | 8/2009 |
| JP | 2016-091972 | 5/2016 |
| WO | WO2007/104450 | 9/2007 |

OTHER PUBLICATIONS

International Search Report for corresponding International Application No. PCT/JP2020/033070, Nov. 2, 2020.
Written Opinion for corresponding International Application No. PCT/JP2020/033070, Mar. 17, 2022.
Chinese Office Action for corresponding CN Application No. 202080058205.9, Jul. 26, 2023 (w/ English machine translation).
Extended European Search Report for corresponding EP Application No. 20860907.3-1113, Sep. 26, 2022.
Japanese Office Action for corresponding JP Application No. 2021-543778, May 7, 2024 (w/ English machine translation).
Japanese Office Action for corresponding JP Application No. 2021-543778, Aug. 6, 2024 (w/ English machine translation).

* cited by examiner

ROTARY CONNECTOR DEVICE AND FLAT CABLE ASSEMBLY FOR ROTARY CONNECTOR DEVICE

CROSS-REFERENCE TO RELATED APPLICATIONS

The present application is a continuation application of International Application No. PCT/JP2020/033070, filed Sep. 1, 2020, which claims priority to Japanese Patent Application No. 2019-161991 filed Sep. 5, 2019. The contents of these applications are incorporated herein by reference in their entirety.

BACKGROUND

Technical Field

The technology disclosed in the present application relates to a rotary connector device and a flat cable assembly for a rotary connector device.

Background Art

Flexible flat cables used in rotary connector devices are known (see, for example, Japanese Patent No. 3889231).

SUMMARY

According to a first aspect of the present application, a flat cable assembly for a rotary connector device includes a first lead block, a first flat cable, and a second flat cable. The first lead block includes a first lead block body and a first conductor that includes a first exposure surface exposed from the first lead block body and is attached to the first lead block body. The first flat cable includes a first cable end portion connected to the first exposure surface so as to extend from the first exposure surface in a first direction. The second flat cable includes a second cable end portion connected to the first exposure surface so as to extend from the first exposure surface in a second direction, which is different from the first direction.

According to second aspect of the present application, a rotary connector includes a stator, a rotator provided rotatably about a rotation axis with respect to the stator, and the flat cable assembly according to the first aspect. The flat cable assembly is disposed at least partially within a cable housing space defined by the stator and the rotator. The first lead block is attached to the rotator. The second lead block is attached to the stator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
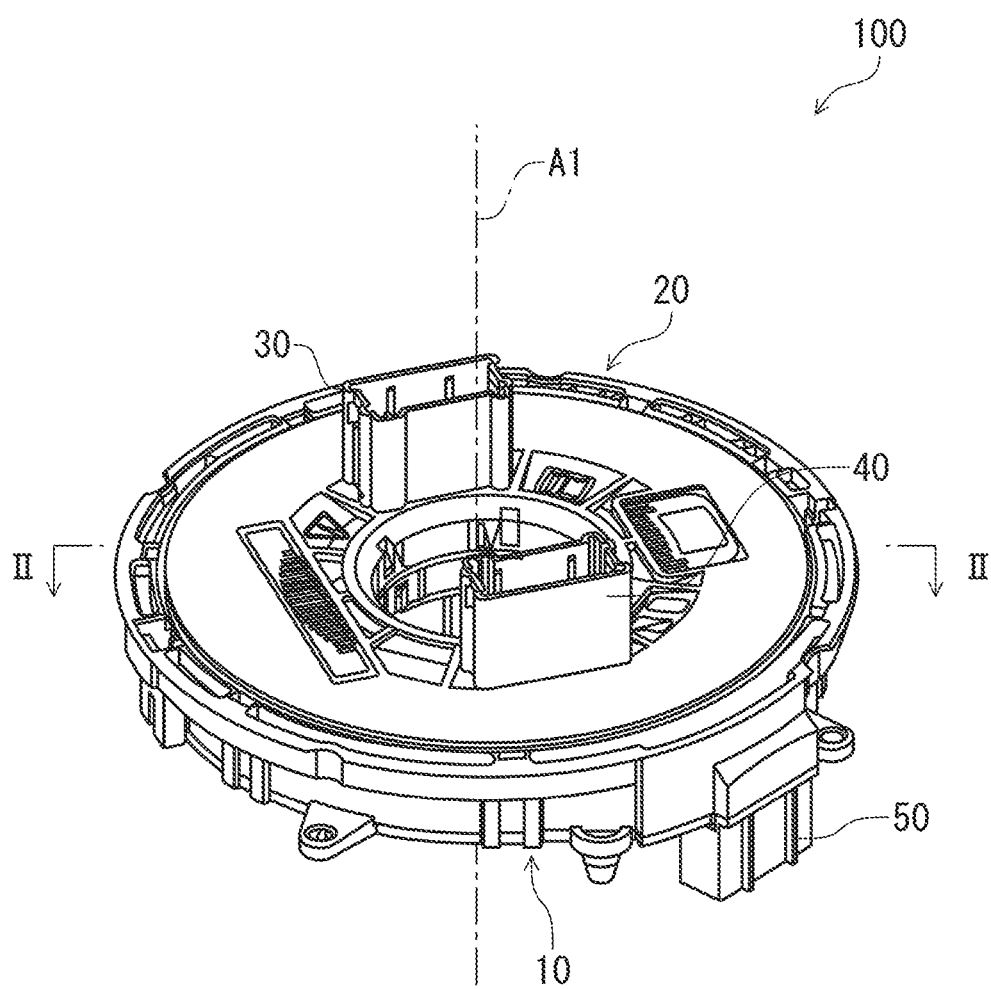
FIG. 1 is a perspective view of a rotary connector device according to a first embodiment.

Hereinafter, embodiments will be described with reference to the drawings. In the drawings, the same reference signs denote corresponding or identical components.

As illustrated in FIG. 1, a rotary connector device 100 includes a stator 10 and a rotator 20. The rotator 20 is provided rotatably about a rotation axis A1 with respect to the stator 10. In the present embodiment, for example, the stator 10 is configured to be fixed to a vehicle body, and the rotator 20 is configured to be fixed to a steering wheel.

The rotary connector device 100 includes a first connector 30, a second connector 40, and a third connector 50. The first connector 30 and the second connector 40 are attached to the rotator 20. The first connector 30 and the second connector 40 are configured to be electrically connected to, for example, a steering side electric connector. The first connector 30 and the second connector 40 are electrically connected via the steering side electric connector to an electric circuit such as a switch of a steering wheel and an airbag device. The third connector 50 is attached to the stator 10. The third connector 50 is configured to be electrically connected to, for example, a vehicle body side electric connector. The third connector 50 is connected via a vehicle body side electric connector to electrical devices (for example, a control device and a battery) provided on the vehicle body.

Figure 2:
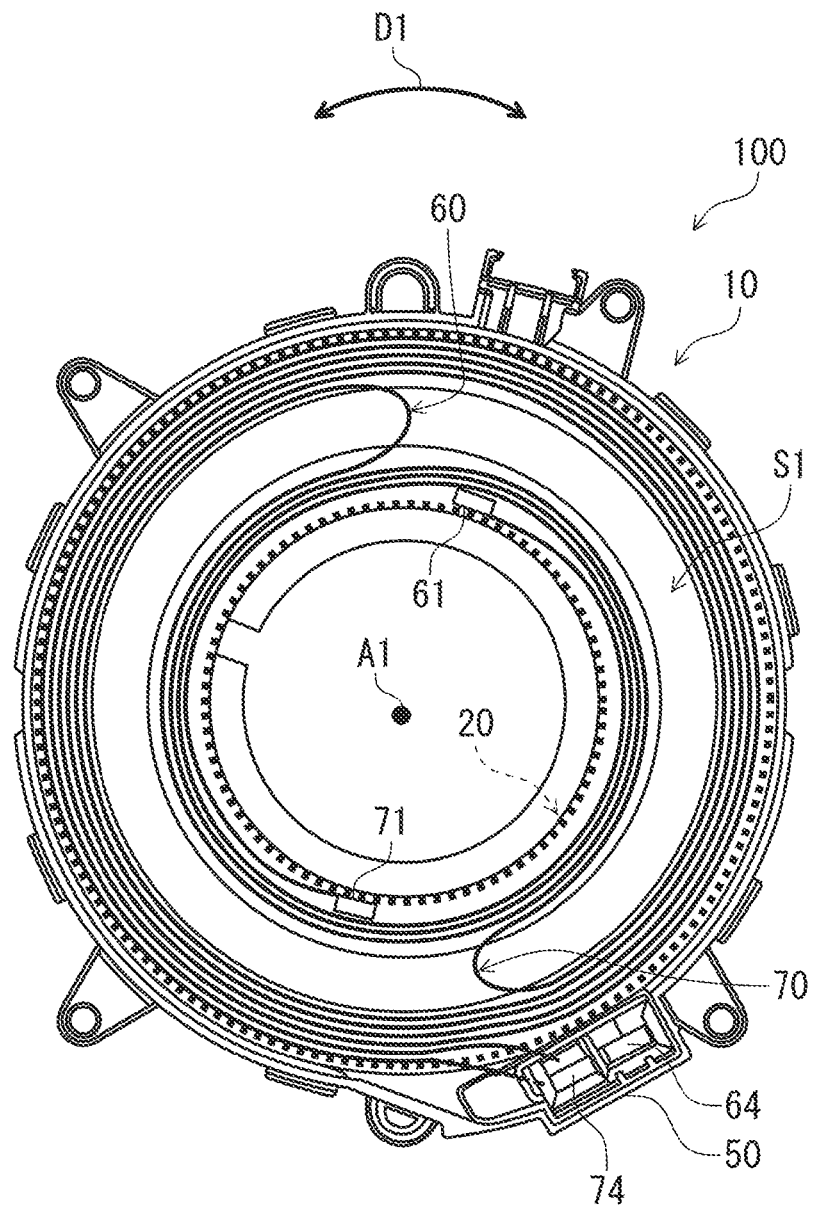
FIG. 2 is a cross-sectional view of the rotary connector device taken along a line II-II of FIG. 1.

As illustrated in FIG. 2, the stator 10 and the rotator 20 define a cable housing space S1, which is provided so as to surround the rotation axis A1, between the stator 10 and the rotator 20. The rotary connector device 100 includes a flat cable assembly 60 for a rotary connector device. The flat cable assembly 60 for a rotary connector device may also be referred to as a flat cable assembly 60. The flat cable assembly 60 is disposed at least partially within the cable housing space S1 defined by the stator and the rotator. For example, the cable housing space S1 is annular and extends in a circumferential direction D1 with respect to the rotation axis A1.

The flat cable assembly 60 is electrically connected to the first connector 30 and the third connector 50 (see FIG. 1). The flat cable assembly 60 is flexible and has a flat shape. The flat cable assembly 60 may also be referred to as a flexible flat cable.

Figure 3:
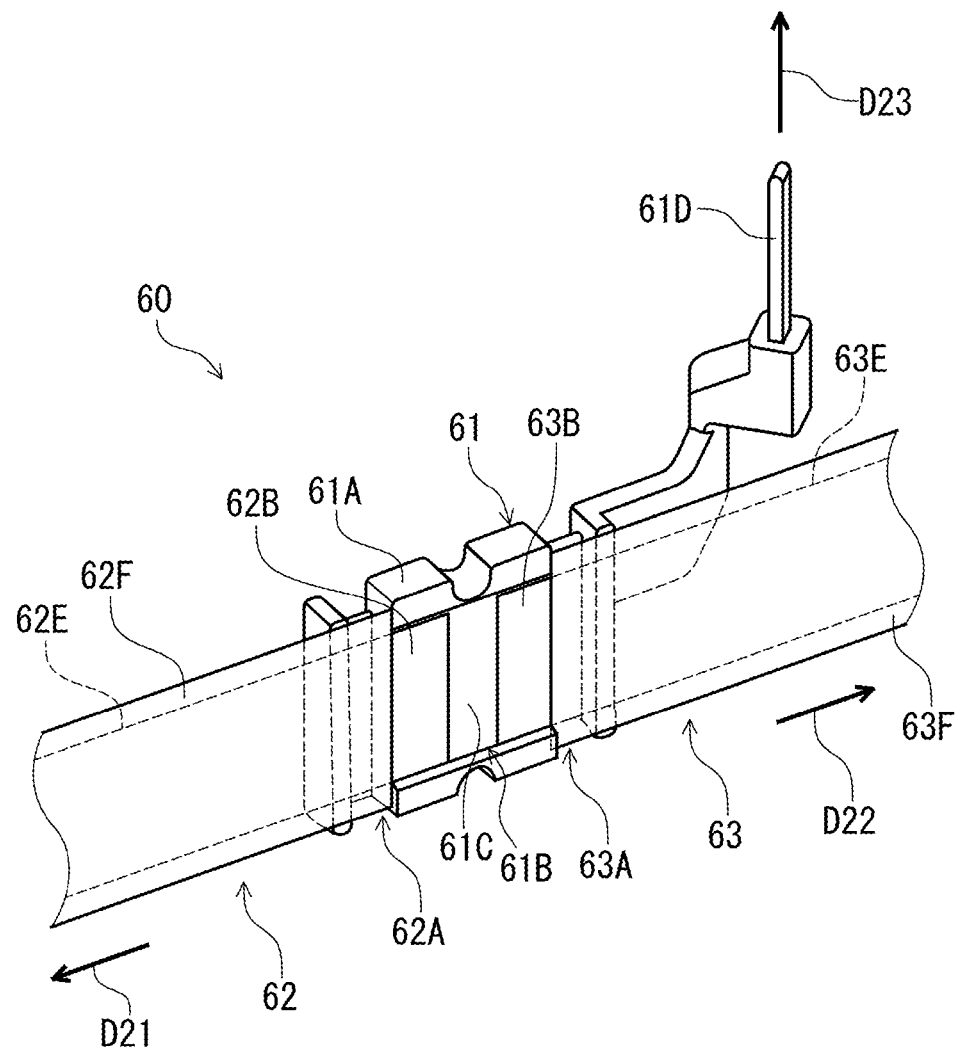
FIG. 3 is a partial perspective view of a flat cable assembly for the rotary connector device illustrated in FIG. 1.

As illustrated in FIG. 3, the flat cable assembly 60 includes a first lead block 61, a first flat cable 62, and a second flat cable 63. The first lead block 61 includes a first lead block body 61A and a first conductor 61B. The first conductor 61B has a first exposure surface 61C being exposed from the first lead block body 61A and is attached to the first lead block body 61A.

In the present embodiment, the first conductor 61B is disposed within the first lead block body 61A. The first lead block body 61A is formed of a non-metal material. For example, the first lead block body 61A is formed of a resin material having insulating properties. On the other hand, the first conductor 61B is formed of a metal material. The first conductor 61B is embedded in the first lead block body 61A by insertion molding. However, the structure of the first lead block 61 is not limited to the present embodiment.

The first flat cable 62 is flexible and has a flat cross-sectional shape. The second flat cable 63 is flexible and has a flat cross-sectional shape. The first flat cable 62 includes a first cable end portion 62A. The first cable end portion 62A is connected to the first exposure surface 61C so as to extend from the first exposure surface 61C in a first direction D21. The second flat cable 63 includes a second cable end portion 63A. The second cable end portion 63A is connected to the first exposure surface 61C so as to extend from the first exposure surface 61C in a second direction D22 different from the first direction D21.

In the present embodiment, the first cable end portion 62A includes a first conductive end 62B. The second cable end portion 63A includes a second conductive end 63B. The first conductive end 62B and the second conductive end 63B are connected to the first exposure surface 61C. For example, the first conductive end 62B and the second conductive end 63B are connected to the first exposure surface 61C by a joining structure such as solder or crimping.

In the present embodiment, the second direction D22 is substantially opposite to the first direction D21. The second direction D22 is substantially parallel to the first direction D21. More specifically, the second direction D22 is opposite the first direction D21. The second direction D22 is parallel to the first direction D21. However, the relationship between the first direction D21 and the second direction D22 is not limited to the present embodiment.

The second cable end portion 63A is disposed on the first exposure surface 61C so as not to overlap with the first cable end portion 62A. The second conductive end 63B is disposed on the first exposure surface 61C so as not to overlap with the first conductive end 62B. The second conductive end 63B is disposed apart from the first conductive end 62B.

The first conductor 61B includes a first protruding portion 61D. The first protruding portion 61D protrudes from the first lead block body 61A in a first protruding direction D23, which is different from at least one of the first direction D21 and the second direction D22. In the present embodiment, the first protruding direction D23 is different from the first direction D21 and the second direction D22. However, the relationship between the first direction D21, the second direction D22, and the first protruding direction D23 is not limited to the present embodiment. The first protruding direction D23 may be the same as at least one of the first direction D21 and the second direction D22.

Figure 4:
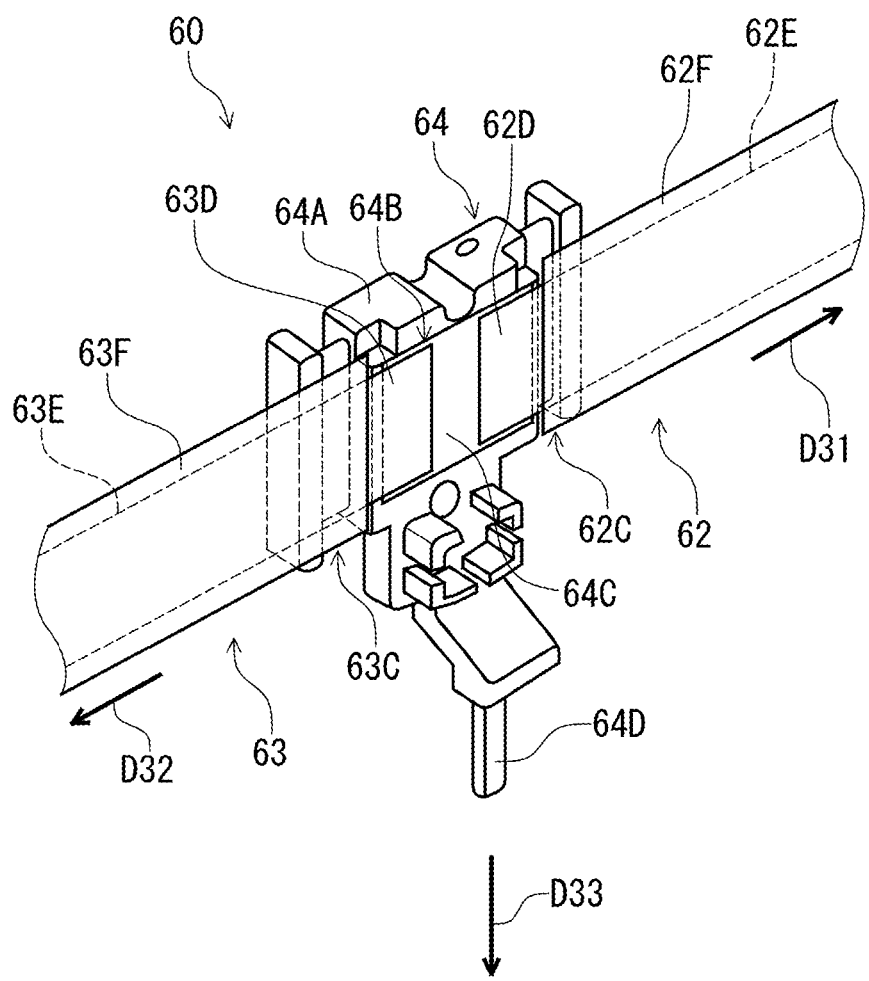
FIG. 4 is a partial perspective view of the flat cable assembly for the rotary connector device illustrated in FIG. 1.

As illustrated in FIG. 4, the flat cable assembly 60 further includes a second lead block 64. The second lead block 64 includes a second lead block body 64A and a second conductor 64B. The second conductor 64B has a second exposure surface 64C being exposed from the second lead block body 64A and is attached to the second lead block body 64A.

In the present embodiment, the second conductor 64B is disposed in the second lead block body 64A. The second lead block body 64A is formed of a non-metal material. For example, the second lead block body 64A is formed of a resin material having insulating properties. On the other hand, the second conductor 64B is formed of a metal material. The second conductor 64B is embedded in the second lead block body 64A by insertion molding. However, the structure of the second lead block 64 is not limited to the present embodiment.

The first flat cable 62 includes a third cable end portion 62C. The third cable end portion 62C is connected to the second exposure surface 64C so as to extend from the second exposure surface 64C in a third direction D31. The second flat cable 63 includes a fourth cable end portion 63C. The fourth cable end portion 63C is connected to the second exposure surface 64C so as to extend from the second exposure surface 64C in a fourth direction D32, which is different from the third direction D31.

In the present embodiment, the third cable end portion 62C includes a third conductive end 62D. The fourth cable end portion 63C includes a fourth conductive end 63D. The third conductive end 62D and the fourth conductive end 63D are connected to the second exposure surface 64C. For example, the third conductive end 62D and the fourth conductive end 63D are connected to the second exposure surface 64C by a joining structure such as solder or crimping.

In the present embodiment, the fourth direction D32 is substantially opposite to the third direction D31. The fourth direction D32 is substantially parallel to the third direction D31. More specifically, the fourth direction D32 is opposite the third direction D31. The fourth direction D32 is parallel to the third direction D31. However, the relationship between the third direction D31 and the fourth direction D32 is not limited to the present embodiment.

The fourth cable end portion 63C is disposed on the second exposure surface 64C so as not to overlap with the third cable end portion 62C. The fourth conductive end 63D is disposed on the second exposure surface 64C so as not to overlap with the third conductive end 62D. The fourth conductive end 63D is disposed apart from the third conductive end 62D.

The second conductor 64B includes a second protruding portion 64D. The second protruding portion 64D protrudes from the second lead block body 64A in a second protruding direction D33, which is different from at least one of the third direction D31 and the fourth direction D32. In the present embodiment, the second protruding direction D33 is different from the third direction D31 and the fourth direction D32. However, the relationship between the third direction D31, the fourth direction D32, and the second protruding direction D33 is not limited to the present embodiment. The second protruding direction D33 may be the same as at least one of the third direction D31 and the fourth direction D32.

As illustrated in FIG. 3 and FIG. 4, the first flat cable 62 includes a first lead wire 62E and a first covering portion 62F having insulating properties and covering the first lead wire 62E. The first lead wire 62E includes the first conductive end 62B and the third conductive end 62D.

The second flat cable 63 includes a second lead wire 63E and a second covering portion 63F having insulating properties and covering the second lead wire 63E. The second lead wire 63E includes the second conductive end 63B and the fourth conductive end 63D.

Figure 5:
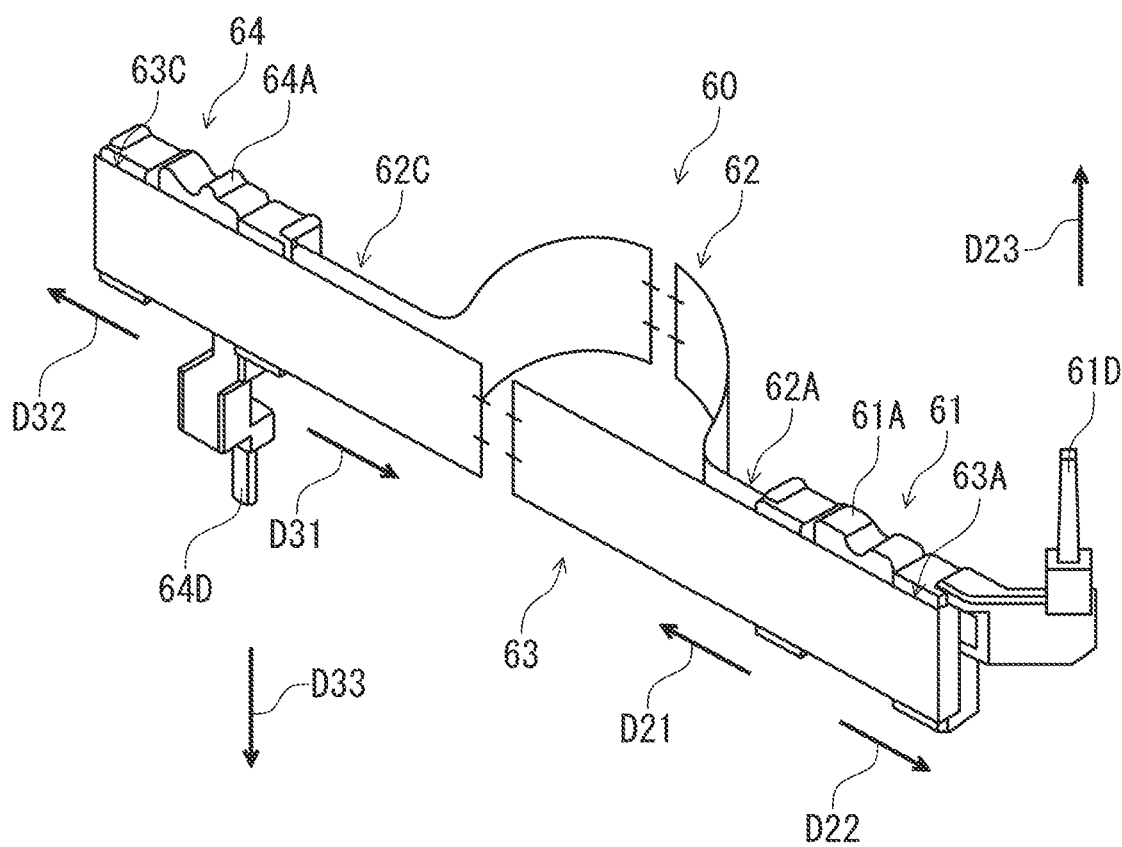
FIG. 5 is a perspective view of the flat cable assembly for the rotary connector device illustrated in FIG. 1.

As illustrated in FIG. 5, the first flat cable 62 extends from the first cable end portion 62A to the third cable end portion 62C. The second flat cable 63 extends from the second cable end portion 63A to the fourth cable end portion 63C. The first flat cable 62 extends in a strip shape from the first cable end portion 62A to the third cable end portion 62C. The second flat cable 63 extends in a strip shape from the second cable end portion 63A to the fourth cable end portion 63C.

In other words, the first cable end portion 62A and the third cable end portion 62C constitute two ends of the first flat cable 62. The second cable end portion 63A and the fourth cable end portion 63C constitute two ends of the second flat cable 63.

The second cable end portion 63A of the second flat cable 63 extends from the first exposure surface 61C in the second direction D22 and is bent so as to extend further in the first direction D21. Similarly, the fourth cable end portion 63C of the second flat cable 63 extends from the second exposure surface 64C in the fourth direction D32 and is bent so as to extend further in the third direction D31. Thus, in a state in which the first lead block 61, the second lead block 64, the first flat cable 62, and the second flat cable 63 are assembled, the second flat cable 63 overlaps with the first flat cable 62. Furthermore, in a state in which the flat cable assembly 60 is assembled, the second protruding direction D33 is opposite the first protruding direction D23. The length of the first flat cable 62 is different from the length of the second flat cable 63. In the present embodiment, the length of the first flat cable 62 is longer than the length of the second flat cable 63.

As illustrated in FIG. 2, in a state in which the flat cable assembly 60 is assembled to the stator 10 and the rotor 20, the first lead block 61 is attached to the rotor 20, and the second lead block 64 is attached to the stator 10. The flat cable assembly 60 is wound in the circumferential direction along a wall of the stator 10 and a wall of the rotor 20 in the cable housing space S1.

Figure 6:
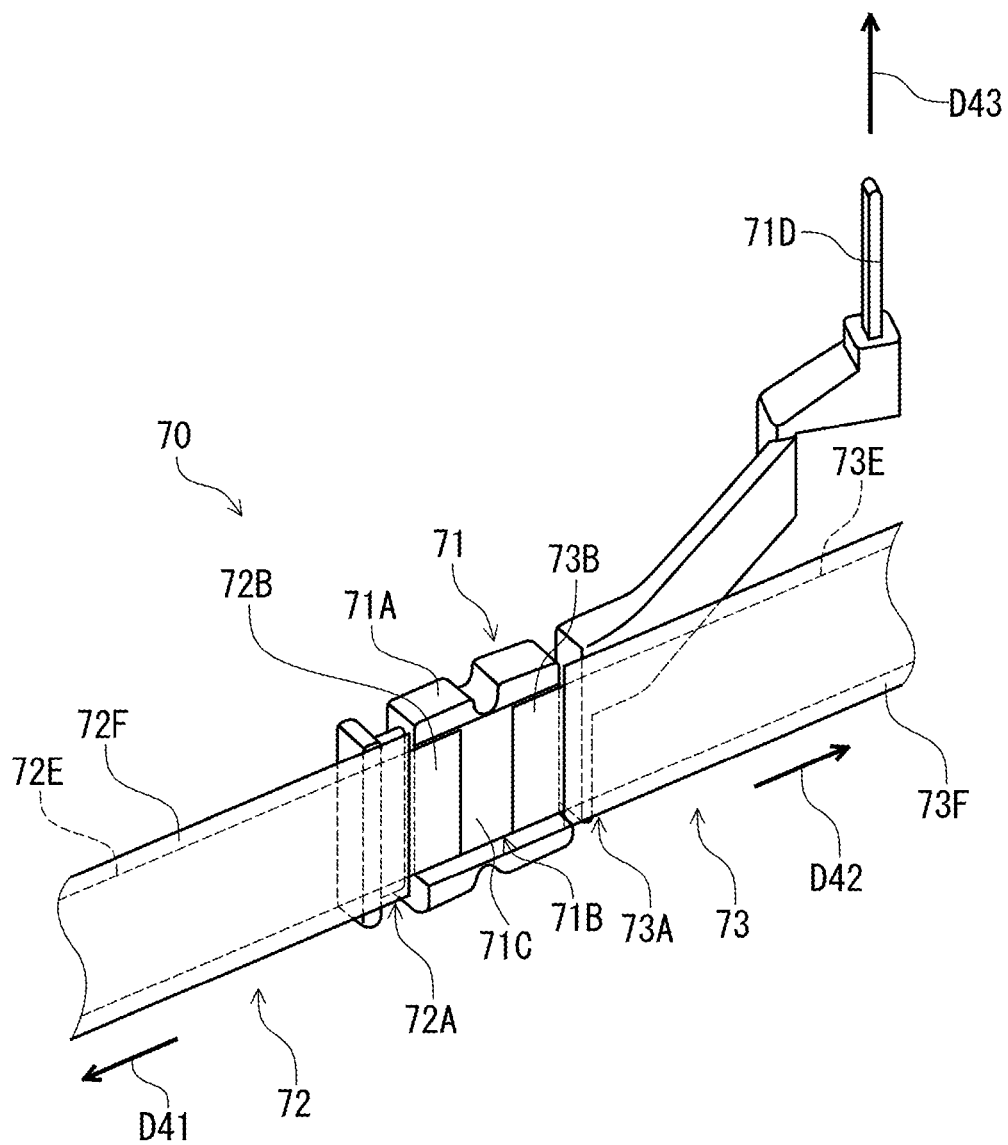
FIG. 6 is a partial perspective view of another flat cable assembly for the rotary connector device illustrated in FIG. 1.
Figure 7:
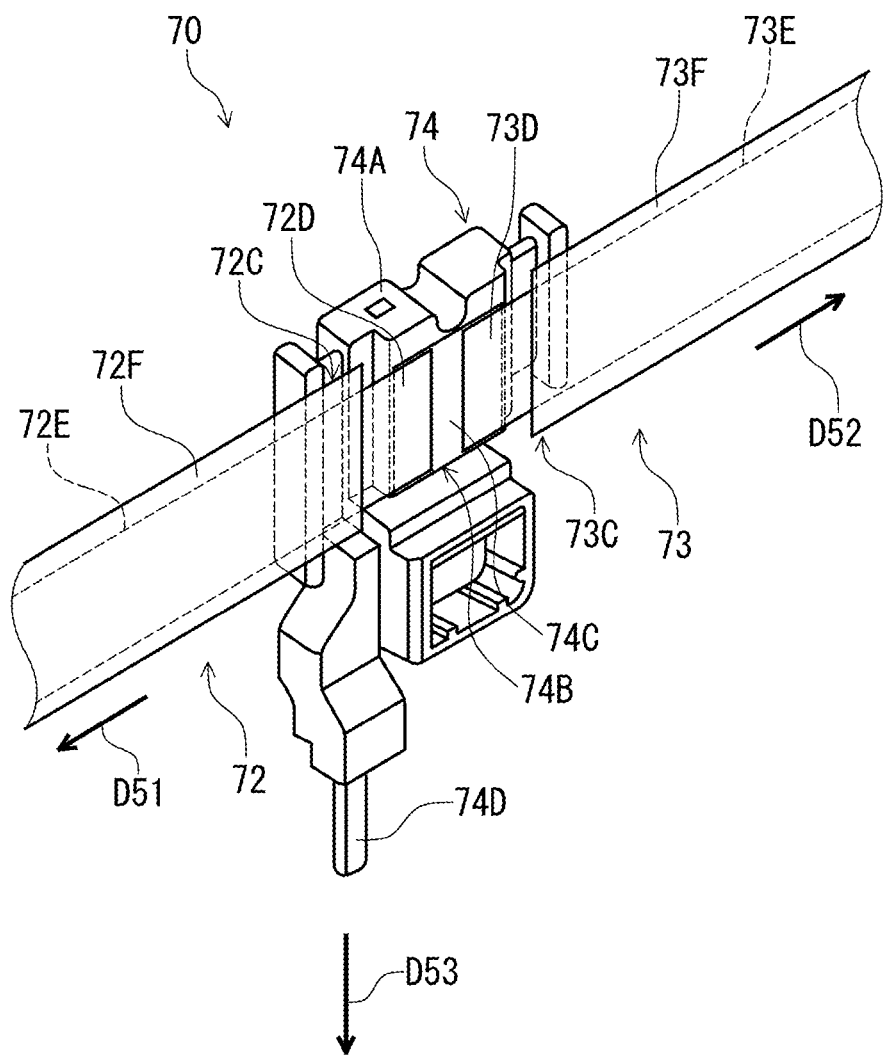
FIG. 7 is a partial perspective view of the flat cable assembly for the rotary connector device illustrated in FIG. 1.
Figure 8:
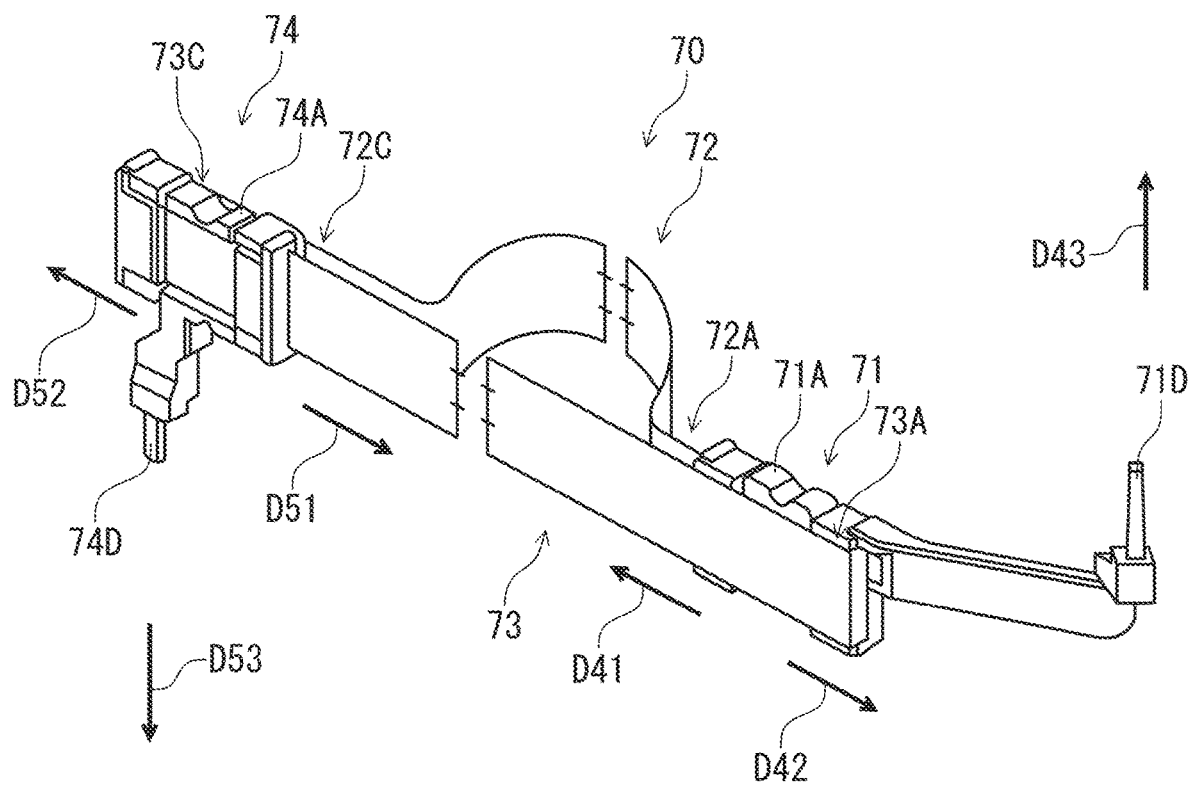
FIG. 8 is a perspective view of the flat cable assembly for the rotary connector device illustrated in FIG. 1.

As illustrated in FIGS. 6 to 8, the rotary connector device 100 includes a flat cable assembly 70 for a rotary connector device. The flat cable assembly 70 includes a first lead block 71, a second lead block 74, a first flat cable 72, and a second flat cable 73. The first lead block 71, the second lead block 74, the first flat cable 72, and the second flat cable 73 of the flat cable assembly 70 has substantially the same structure as the first lead block 61, the second lead block 64, the first flat cable 62, and the second flat cable 63 of the flat cable assembly 60. Thus, a description of the first lead block 61, the second lead block 64, the first flat cable 62, and the second flat cable 63 can be substituted for a description of the first lead block 71, the second lead block 74, the first flat cable 72, and the second flat cable 73 by replacing "61", "62", "63", "64", "65", "66", "D21", "D22", "D23", "D31", "D32", and "D33" with "71", "72", "73", "74", "D41", "D42", "D43", "D51", "D52", and "D53", respectively.

As illustrated in FIG. 8, a second cable end portion 73A of the second flat cable 73 extends in a second direction D42 from the first lead block 71, and then is bent in a first direction D41. Similarly, a fourth cable end portion 73C of the second flat cable 73 extends from the second lead block 74 in a fourth direction D52, and then is bent in a third direction D51. Thus, in a state in which the first lead block 71, the second lead block 74, the first flat cable 72, and the second flat cable 73 are assembled, the second flat cable 73 overlaps with the first flat cable 72. Furthermore, in a state in which the flat cable assembly 70 is assembled, a second protruding direction D53 is opposite a first protruding direction D43. The length of the first flat cable 72 is different from the length of the second flat cable 73. In the present embodiment, the length of the first flat cable 72 is longer than the length of the second flat cable 73.

The characteristics of the flat cable assembly 60 are as follows.

(1) As illustrated in FIGS. 3 to 5, the flat cable assembly 60 includes the first lead block 61, the first flat cable 62, and the second flat cable 63. The first lead block 61 includes the first lead block body 61A and the first conductor 61B that includes the first exposure surface 61C exposed from the first lead block body 61A and is attached to the first lead block body 61A. The first flat cable 62 includes the first cable end portion 62A connected to the first exposure surface 61C so as to extend from the first exposure surface 61C in the first direction D21. The second flat cable 63 includes the second cable end portion 63A connected to the first exposure surface 61C so as to extend from the first exposure surface 61C in the second direction D22, which is different from the first direction D21.

In the flat cable assembly 60, the second cable end portion 63A extends from the first exposure surface 61C in the second direction D22, which is different from the first direction D21 in which the first cable end portion 62A extends, and thus the degree of freedom in disposing the first flat cable 62 and the second flat cable 63 can be increased. This can reduce the manufacturing cost of the flat cable assembly 60.

(2) The second direction D22 is substantially opposite to the first direction D21, and thus the degree of freedom in disposing the first flat cable 62 and the second flat cable 63 can be further increased.

(3) The second direction D22 is substantially parallel to the first direction D21, and thus the degree of freedom of disposing the first flat cable 62 and the second flat cable 63 can be further increased.

(4) The second cable end portion 63A is disposed on the first exposure surface 61C so as not to overlap with the first cable end portion 62A. Accordingly, the degree of freedom in disposing the first flat cable 62 and the second flat cable 63 can be further increased while interference between the first cable end portion 62A and the second cable end portion 63A is suppressed.

(5) The first cable end portion 62A includes the first conductive end 62B. The second cable end portion 63A includes the second conductive end 63B. The second conductive end 63B is disposed on the first exposure surface 61C so as not to overlap with the first conductive end 62B. Accordingly, the degree of freedom in disposing the first flat cable 62 and the second flat cable 63 can be further increased while interference between the first cable end portion 62A and the second cable end portion 63A is suppressed.

(6) The first conductor 61B includes the first protruding portion 61D protruding from the first lead block body 61A in the first protruding direction D23, which is different from at least one of the first direction D21 and the second direction D22. Accordingly, other connectors can be connected to the flat cable assembly 60 using the first protruding portion 61D.

(7) The second cable end portion 63A extends from the first exposure surface 61C in the second direction D22 and is bent to extend further in the first direction D21. Accordingly, the first flat cable 62 and the second flat cable 63 can be formed compactly in the vicinity of the first lead block 61.

(8) The flat cable assembly 60 further includes the second lead block 64. The second lead block 64 includes the second lead block body 64A and the second conductor 64B that includes the second exposure surface 64C exposed from the second lead block body 64A and is attached to the second lead block body 64A. The first flat cable 62 includes the third cable end portion 62C connected to the second exposure surface 64C so as to extend from the second exposure surface 64C in the third direction D31. The second flat cable 63 includes the fourth cable end portion 63C connected to the second exposure surface 64C so as to extend from the second exposure surface 64C in the fourth direction D32, which is different from the third direction D31.

The fourth cable end portion 63C extends from the second exposure surface 64C in the fourth direction D32, which is different from the third direction D31 in which the third cable end portion 62C extends, and thus the degree of freedom in disposing the first flat cable 62 and the second flat cable 63 can be increased. This can reduce the manufacturing cost of the flat cable assembly 60.

(9) The fourth direction D32 is substantially opposite to the third direction D31, and thus the degree of freedom in disposing the first flat cable 62 and the second flat cable 63 can be further increased.

(10) The fourth direction D32 is substantially parallel to the third direction D31, and thus the degree of freedom in disposing the first flat cable 62 and the second flat cable 63 can be further increased.

(11) The fourth cable end portion 63C is disposed on the second exposure surface 64C so as not to overlap with the third cable end portion 62C. Accordingly, the degree of freedom in disposing the first flat cable 62 and the second flat cable 63 can be further increased while interference between the third cable end portion 62C and the fourth cable end portion 63C is suppressed.

(12) The third cable end portion 62C includes the third conductive end 62D. The fourth cable end portion 63C includes the fourth conductive end 63D. The fourth conductive end 63D is disposed on the second exposure surface 64C so as not to overlap with the third conductive end 62D. Accordingly, the degree of freedom in disposing the first flat cable 62 and the second flat cable 63 can be further increased while interference between the third cable end portion 62C and the fourth cable end portion 63C is suppressed.

(13) The fourth cable end portion 63C extends from the second exposure surface 64C in the fourth direction D32, and is bent to extend further in the third direction D31. Accordingly, the first flat cable 62 and the second flat cable 63 can be formed compactly in the vicinity of the second lead block 64.

(14) The second conductor 64B includes the second protruding portion 64D protruding from the second lead block body 64A in the second protruding direction D33, which is different from at least one of the third direction D31 and the fourth direction D32. Accordingly, other connectors can be connected to the flat cable assembly 60 using the second protruding portion 64D.

(15) The first flat cable 62 extends from the first cable end portion 62A to the third cable end portion 62C. The second flat cable 63 extends from the second cable end portion 63A to the fourth cable end portion 63C. Accordingly, the first lead block 61 and the second lead block 64 can be disposed at two ends of the first flat cable 62 and at two ends of the second flat cable 63.

(16) The rotary connector device 100 includes the stator 10, the rotator 20 provided rotatably about the rotation axis A1 with respect to the stator 10, and the flat cable assembly 60 for a rotary connector device disposed at least partially in the cable housing space S1, which is defined by the stator 10 and the rotator 20.

The rotary connector device 100 can reduce the manufacturing cost of the flat cable assembly 60 for a rotary connector device. Accordingly, the manufacturing cost of the rotary connector device 100 can be reduced as well.

Note that the flat cable assembly 70, as with the flat cable assembly 60, can exhibit the effects of (1) to (16) described above.

Furthermore, although in the embodiment described above, the first flat cable 62 is a flat cable separate from the second flat cable 63, the first flat cable 62 and the second flat cable 63 may be an integral flat cable. For example, by connecting the third cable end portion 62C and the fourth cable end portion 63C, the first flat cable 62 and the second flat cable 63 may be configured as an integral flat cable. In such a case, for example, the integral flat cable includes an intermediate portion corresponding to the third cable end portion 62C and the fourth cable end portion 63C, the intermediate portion being connected to the second lead block 64. The same configuration can be applied to the first flat cable 72 with respect to the second flat cable 73.

It should be noted that, in the present application, "comprise" and its derivatives are non-limiting terms describing the presence of a component and do not exclude the presence of other components not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, all of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) all of A, B, and C. In the present disclosure, the expression "at least one of A and B" is not interpreted as "at least one of A and at least one of B".

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A flat cable assembly for a rotary connector device, comprising:
   a first lead block comprising a first lead block body and a first conductor comprising a first exposure surface exposed from the first lead block body, the first conductor being attached to the first lead block body;
   a first flat cable comprising a first cable end portion connected to the first exposure surface so as to extend from the first exposure surface in a first direction; and
   a second flat cable comprising a second cable end portion connected to the first exposure surface so as to extend from the first exposure surface in a second direction that is different from the first direction, wherein
   the second cable end portion is disposed on the first exposure surface so as not to overlap with the first cable end portion, the first flat cable is a separate flat cable from the second flat cable, and the first cable end portion and the second cable end portion are connected to the first exposure surface which is a single surface.

2. The flat cable assembly according to claim 1, wherein the second direction is substantially opposite to the first direction.

3. The flat cable assembly according to claim 1, wherein the second direction is substantially parallel to the first direction.

4. The flat cable assembly according to claim 1, wherein
the first cable end portion comprises a first conductive end,
the second cable end portion comprises a second conductive end, and
the second conductive end is disposed on the first exposure surface not to overlap with the first conductive end.

5. The flat cable assembly according to claim 1, wherein the first conductor comprises a first protruding portion protruding from the first lead block body in a first protruding direction that is different from at least one of the first direction and the second direction.

6. The flat cable assembly according to claim 1, wherein the second cable end portion extends from the first exposure surface in the second direction and is bent to extend further in the first direction.

7. A flat cable assembly for a rotary connector device, comprising:
a first lead block comprising a first lead block body and a first conductor comprising a first exposure surface exposed from the first lead block body, the first conductor being attached to the first lead block body;
a first flat cable comprising a first cable end portion connected to the first exposure surface so as to extend from the first exposure surface in a first direction;
a second flat cable comprising a second cable end portion connected to the first exposure surface so as to extend from the first exposure surface in a second direction that is different from the first direction; and
a second lead block comprising a second lead block body and a second conductor comprising a second exposure surface exposed from the second lead block body, the second conductor being attached to the second lead block body, wherein
the first flat cable comprises a third cable end portion connected to the second exposure surface to extend from the second exposure surface in a third direction, and
the second flat cable comprises a fourth cable end portion connected to the second exposure surface to extend from the second exposure surface in a fourth direction that is different from the third direction.

8. The flat cable assembly according to claim 7, wherein the fourth direction is substantially opposite to the third direction.

9. The flat cable assembly according to claim 7, wherein the fourth direction is substantially parallel to the third direction.

10. The flat cable assembly according to claim 7, wherein the fourth cable end portion is disposed on the second exposure surface not to overlap with the third cable end portion.

11. The flat cable assembly according to claim 10, wherein
the third cable end portion comprises a third conductive end,
the fourth cable end portion comprises a fourth conductive end, and
the fourth conductive end is disposed on the second exposure surface not to overlap with the third conductive end.

12. The flat cable assembly according to claim 7, wherein the fourth cable end portion extends from the second exposure surface in the fourth direction and is bent to extend further in the third direction.

13. The flat cable assembly according to claim 7, wherein the second conductor comprises a second protruding portion protruding from the second lead block body in a second protruding direction that is different from at least one of the third direction and the fourth direction.

14. The flat cable assembly according to claim 7, wherein
the first flat cable extends from the first cable end portion to the third cable end portion, and
the second flat cable extends from the second cable end portion to the fourth cable end portion.

15. A rotary connector device comprising:
a stator;
a rotator provided rotatably about a rotation axis with respect to the stator; and
the flat cable assembly according to claim 8, the flat cable assembly being disposed at least partially within a cable housing space defined by the stator and the rotator,
the first lead block being attached to the rotator, and
the second lead block being attached to the stator.

16. The flat cable assembly according to claim 1, wherein a length of the first flat cable is different from a length of the second flat cable.

* * * * *